US009740990B2

(12) United States Patent
Watkins

(10) Patent No.: US 9,740,990 B2
(45) Date of Patent: Aug. 22, 2017

(54) METHOD AND SYSTEM FOR RESERVING AND CONTROLLING ACCESS TO PRODUCTS AND SERVICES AT A REMOTE LOCATION VIA A COMMUNICATIONS NETWORK

(75) Inventor: Jennifer Watkins, Bellevue, NE (US)

(73) Assignee: Starlight LLC, Highlands Ranch, CO (US)

( * ) Notice: Subject to any disclaimer, the term of this patent is extended or adjusted under 35 U.S.C. 154(b) by 0 days.

(21) Appl. No.: 13/104,525

(22) Filed: May 10, 2011

(65) Prior Publication Data
US 2011/0213630 A1 Sep. 1, 2011

Related U.S. Application Data

(62) Division of application No. 11/661,989, filed as application No. PCT/US2005/032820 on Sep. 16, 2005, now abandoned.
(Continued)

(51) Int. Cl.
G06Q 10/00 (2012.01)
G06Q 10/04 (2012.01)
(Continued)

(52) U.S. Cl.
CPC ........... G06Q 10/043 (2013.01); G06Q 10/02 (2013.01); G06Q 30/0203 (2013.01); G06Q 30/0206 (2013.01)

(58) Field of Classification Search
CPC ............... G06Q 10/02; G06Q 10/0203; G06Q 10/0206; G06Q 10/043
(Continued)

(56) References Cited

U.S. PATENT DOCUMENTS 4,479,194 A * 10/1984 Fogg et al. ................... 235/386
5,761,648 A * 6/1998 Golden et al. ............. 705/14.36
(Continued)

OTHER PUBLICATIONS https://en.wikipedia.org/wiki/Shibboleth, retrieved from the web Sep. 17, 2016, pp. 1-7.*
(Continued)

Primary Examiner — Jonathan G Sterrett
Assistant Examiner — Mehmet Yesildag

(57) ABSTRACT

This invention is a method and system for reserving and controlling access to products and services at a remote location via a communications network. In one or more embodiment, a user uses a client computer to select desired products and services. The system returns a price offer for the packaged products and services. Upon acceptance of the price offer, the selection of products and services is forwarded to an operations center for the building of an event regarding the redemption of the products and services. The system allocates a time frame for the redemption of each of the products and services as well as determining the order of redemption, based on polling a plurality of users desiring the same products and services in an event. The information generated by the operation center is then forwarded to a location for the redemption of the products and services. Access to the goods and services is then controlled by using machine readable labels coupled with interrogation devices for the relating of users to information regarding the user's reservation.

7 Claims, 7 Drawing Sheets

Related U.S. Application Data

Figure 1:
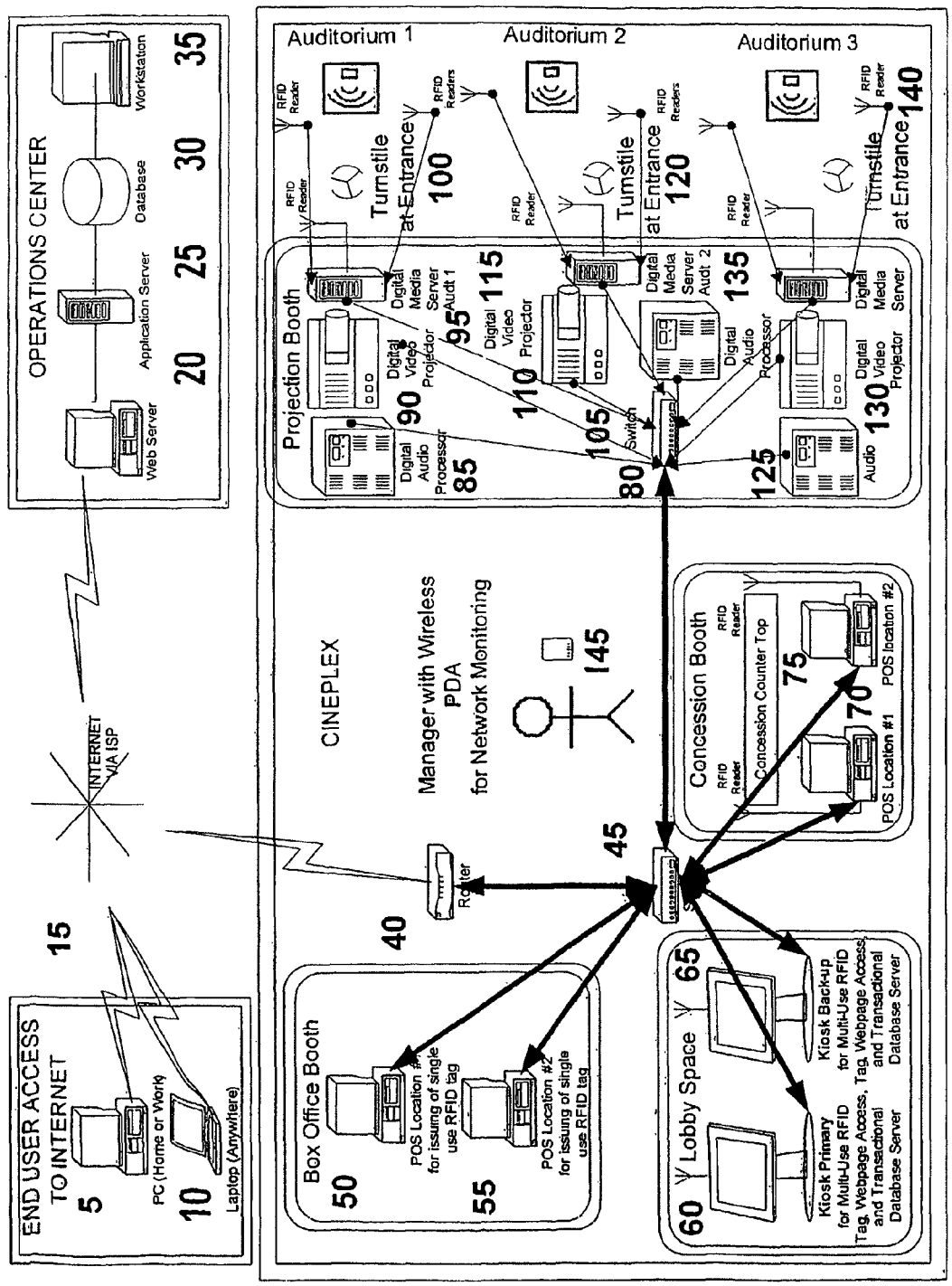

(60) Provisional application No. 60/611,251, filed on Sep. 20, 2004.

(51) Int. Cl.
*G06Q 10/02* (2012.01)
*G06Q 30/02* (2012.01)

(58) Field of Classification Search
USPC .................................................. 705/7.11, 26
See application file for complete search history.

(56) References Cited

U.S. PATENT DOCUMENTS

| | | | |
|---|---|---|---|
| 6,012,088 A | 1/2000 | Li et al. | |
| 6,363,488 B1 | 3/2002 | Ginter et al. | |
| 6,385,655 B1 | 5/2002 | Smith | |
| 6,536,037 B1 | 3/2003 | Guheen et al. | |
| 6,606,744 B1 | 8/2003 | Mikurak | |
| 7,630,908 B1* | 12/2009 | Amrien et al. | 705/3 |
| 2001/0032154 A1* | 10/2001 | Schummer | 705/30 |
| 2002/0082859 A1* | 6/2002 | Lancos et al. | 705/1 |
| 2002/0169666 A1* | 11/2002 | Ike et al. | 705/14 |
| 2003/0043042 A1* | 3/2003 | Moores et al. | 340/573.1 |
| 2003/0115162 A1* | 6/2003 | Konick | 705/404 |
| 2003/0144971 A1* | 7/2003 | Das et al. | 705/401 |
| 2008/0238617 A1* | 10/2008 | Kuhl et al. | 340/10.1 |
| 2008/0275819 A1* | 11/2008 | Rifai | 705/44 |
| 2009/0144131 A1* | 6/2009 | Chiu et al. | 705/10 |
| 2009/0315670 A1* | 12/2009 | Naressi et al. | 340/5.8 |

OTHER PUBLICATIONS

"The need to improve remote access to online library resources: filling the gap between commercial vendor and academic user practice", DT Covey—portal: Libraries and the Academy, 2003—muse.jhu.edu.*

PCT Notification of Transmittal of International Preliminary Report on Patentability (Form PCT/IPEA/416) dated Jun. 17, 2008 for Application No. PCT/US05/32820.

PCT International Preliminary Report on Patentability (Form PCT/IPEA/409) dated Jun. 8, 2008 for Application No. PCT/US05/32820.

PCT Notification of Transmittal of the International Search Report and the Written Opinion of the International Searching Authority, or the Declaration (Form PCT/ISA/220) dated Sep. 26, 2007 for Application No. PCT/US05/32820.

PCT International Search Report (Form PCT/ISA/210) dated Sep. 26, 2007 for Application No. PCT/US05/32820.

PCT Written Opinion of the International Searching Authority (Form PCT/ISA/237) dated Sep. 26, 2007 for Application No. PCT/US05/32820.

* cited by examiner

METHOD AND SYSTEM FOR RESERVING AND CONTROLLING ACCESS TO PRODUCTS AND SERVICES AT A REMOTE LOCATION VIA A COMMUNICATIONS NETWORK

CROSS-REFERENCE TO RELATED APPLICATIONS

This application is a division of Ser. No. 11/661,989 filed Oct. 2, 2007, which is a 371 National Phase entry of PCT/US2005/032820, filed Sep. 16, 2005 and which claims the benefit of provisional application 60/611,251, filed Sep. 20, 2004, all of which are being incorporated in their entirety herein by reference.

BACKGROUND OF THE INVENTION

This method and system is related to using the Internet and other communications networks for the reservation of goods and services for later redemption at a remote location.

FIELD OF INVENTION

The invention relates to methods and apparatus for managing access to products and services at an event location, such as a theater multiplex or theme park.

DISCUSSION OF PRIOR ART

Presently, the quality of service and the quality of crowd control management suffer at entertainment venues such as movie theaters and theme parks. This is due to the inability of users to preplan their experience at such locations. Moreover, the problem is coupled with the entertainment venue's lack of foresight into their patrons' desired experience prior to patron arrival at the location.

Waiting in Line

There are a number of circumstances where people have to wait in line in order to do something. At amusement parks, for example, a customer often needs to wait in line to ride an attraction. Other situations where people have to wait in line are at banks, a bakery, at government offices, to buy tickets for shows or concerts, to gain admissions to museums, or at any other place where the number of people arriving to take advantage of goods or services at any one time exceeds the speed at which any one customer or group of customers can be served, when such a situation occurs, a line forms.

Sacrificing Other Activities

Although customers wait in line, none prefer it. People feel that time spent in line is time wasted. A customer would much rather come back later when there is no line so the customer can do other things instead of waiting in line. This problem is particularly found in a cinema multiplex. A cinema multiplex may have numerous offerings. If a customer must wait in line for each offering, the customer may miss out on other offerings such as information about upcoming movies, safety instructions, or pre-feature entertainment. In a theme park context, an amusement park may have hundreds of attractions, including rides, shops, shows, stores, games, parades, displays, and food services. If a customer must wait in line for each attraction, the customer may only be able to utilize a small number of attractions in a visit. Not only is the customer frustrated at not being able to access more attractions, but the customer is frustrated for having paid for an admission to attractions not used by the customer.

Sacrificing Other Revenues

The amusement park itself suffers from having underutilized attractions because the customers are waiting in line for other higher demand attractions. Instead of waiting in line for a single high demand attraction, a customer could be riding other attractions, eating food, shopping at stores, playing games, or participating in other activities. It would be preferable if the customer could avoid extended lines associated with high demand attractions while still being able to utilize other attractions sometime during the customer's visit.

Solutions in Prior Arts

There are a number of techniques in the prior art to handle the problems associated with waiting in line. One approach to dealing with people in lines is to attempt to make the waiting more enjoyable or to make the time "go faster." In some arrangements, customers waiting in line are entertained, such as with television, music, reading material, and so forth, so as to distract them and take their mind off of waiting in line. However, such schemes do nothing to prevent the need to wait in line.

Other prior art schemes have been used to attempt to eliminate the need to stand in line. One such arrangement is where each customer arriving at a location of services is provided with a number that increments for each newly arriving customer. Numbers are called in order, with the holder of a called number being entitled to service. Such schemes are often used at bakeries and other food establishments. This arrangement avoids the need for customers to stand in a physical line in order to determine the order in which they will be served. When the customer observes that the current number being serviced is so much lower than the customer assigned number, the customer might leave the establishment and return when the customer expects the customer's number to be called.

This scheme requires a lot of guesswork by the customer, and provides no clear guidance for the customer as to when the customer should return. More often than not, the expected time delay between the current number being serviced and the customer's number is such that the customer feel compelled to wait at the establishment to avoid missing the customer's opportunity to be served. So although a physical line might be avoided in such a scheme, the waiting itself is not really avoided.

Some prior art schemes at amusement parks and other attractions have attempted to avoid the need to have customers wait in line. In a first known arrangement, a number of tickets are sold or distributed based on an operating time of an attraction and the capacity of the attraction. A problem with this scheme is that it is a "dumb" system. The assumption is that attraction will have predictable loading and operating times, and will operate at the capacity of the tickets distributed. A problem with this system is that it does not take into account actual real time performance of the attraction, no dynamic real time capacity of the attraction.

Another problem with this first system or scheme is that a customer can line up for multiple tickets for the same scheduled attraction operation. If the customer keeps the multiple tickets, the attraction does not operate at peak capacity, leading to a situation where the efficiency of the attraction (number of riders per attraction cycle) is lower than if a simple wait in line scheme is used. In addition, the system does not take down time or slow downs into account, so that tickets for later operation are distributed when the attraction may not actually be operating, or when it may be still servicing customers from earlier operations times. This leads to waiting in line or to an inability to use the tickets at all.

Another problem with the scheme is that it requires all customers to use the system. There is no alternative scheme available that a customer could use in place of the scheme, even when the scheme leads to more delays. If the customer does not obtain a ticket, then the customer is not permitted to access an attraction.

Another attempt to eliminate or reduce the need to stand in line is described in U.S. Pat. No. 5,502,806 to Mahoney (the Mahoney patent or the '806 patent). The Mahoney patent describes a waiting in line management system where a customer is issued a card or electronic ID device and by which the customer is permitted to use a plurality of computer access terminals. The access terminals are located, for example, in an amusement park. A customer using the card at the access terminal is advised of time slot windows available for a number of attractions and performances. The customer chooses one or more time slots for one or more attractions and thereby is able to pre-schedule the use of attractions.

A problem with the Mahoney scheme is that it allows customers to reserve the right to use a number of attractions, potentially preventing others from using the attraction. Another problem is that by allowing the customer to select a time slot, the Mahoney system lacks responsiveness to changing ride conditions and performance data. In addition, the slot themselves are determined by a pre-established allotment. Such advance assignment of time slots suffers from the same disadvantages as the above-described first known scheme in that there is no dynamic changing of time slot allocation based on actual attraction conditions. This condition could result in customers being required to stand in line if conditions have slowed down, eliminating the very benefit the system is intended to provide. Mahoney suggest that if such a situation occurs, then customers who do not have passes will be required to wait longer than customers with passes, and leads to unacceptable wait times for customers without passes. Another problem with permitting customers to select time slots is that all of the time slots may be selected for certain periods of the day, such as 2-5 p.m., while few or none of the slots may be selected for other periods of the day, such as 12-1 p.m. In this arrangement, the attraction may be underutilized during certain periods of time.

The Mahoney scheme manages slot times allocation based on a fixed capacity of individual attraction. In actual practice, the capacity of an attraction may not be achievable due to a variety of factors, including number of customers, the demographics of the customers, attraction performance, the number of customer vehicles associated with the ride which are in service over time, the number of staff members available to operate the ride, safety factors, weather, etc. For example, the total number of customers in a park who may even desire to access any attraction may be much less at one time of day (such as opening) than another time of day (such as mid-day). In addition, the capacity of an attraction may change due to a variety of circumstances. A ride may be taken out of service for a period of time or one or more "cars" or associated customer vehicles may be removed from the ride, lessening the capacity. The number of staff available to operate the ride may fluctuate during the day. If a fewer number of staff members are available, such as at a shift change, the number of patrons which may be loaded into each customer car, or the number of cars which may be loaded may be reduced. When slow downs occur and customers with passes must wait in line, the time slots reserved by those customers for other attractions may expire. This not only frustrates the customers with passes, but leads to potential empty seats on other attractions.

Another attempt to eliminate or reduce the need to stand in line is described in U.S. Pat. No. 6,173,209 to Laval (the Laval patent or the '209 patent). This patent fails by not providing a contingency plan should an attraction be inoperable. The system is dependent on a single arrival time window. The time window given to the user places them in the priority queue, without a measure for contingency should the attraction go down. For example, should the attraction need temporary maintenance, while the attraction is not functioning, those in the priority queue just build up to the point where the priority queue does not offer a more competitive wait time to the regular non-preferred queue at a fully functionally attraction. In this instance, like the Mahoney patent, the regular non-preferred queue must wait for the entire priority queue to be dispersed before admission, leading to unacceptable wait times.

No Contingency Plan

All of the current systems fail by not having a contingency plan should the user miss their ticket number being called or miss their time window expiration. A system needs to be put in place where either the user has the option for a pay for performance type billing method, or another time window for backup, should an attraction or service be temporarily unavailable in the first assigned time window. As an example, the current systems do not offer refunds or discounts should an attraction go permanently down nor do the current system offer two sets of time windows for access to the priority queue. None of the prior art is dynamic in respect to what happens if the attraction goes permanently down or if the attraction goes down for an extended amount, eliminating the advantages that the existing systems claim.

Pay for use Method

The current systems also fail by providing the assumption that if the user pays for access to the theme park, the user will get to participate in a desired attraction. Such an all inclusive price package does not take in account attractions that may be unavailable for extended amounts of time. Furthermore, there is an inability for the user not to be charged for attractions not wanted or desired. For example, those with health conditions or ailments may be excluding from the use of certain attractions, yet they still have to pay for access to something they will never use. A pay for what you consume system would be more appropriate to certain users.

No Tools for Complete Packages

At a theater complex, the current systems fails due to the lack of tools provided to a user to buy complete service packages prior to arrival to an entertainment venue. For example, while there is the ability to pre-register for a movie, any decisions about purchasing additional goods and services are determined while on site. This spontaneity can actually be a detriment to the user's experience by resulting in extended queues.

For example, upon arrival at a movie theatre, there may be at least three different queues to wait in before arriving to your final destination. For patrons already knowing which products and services are desired, this time delay can be very frustrating. To further extend the time delay, there are employees assisting the patrons in order fulfillment. The employees must wait on the patrons, take the orders, perform cash transactions, prepare goods, and then present the goods. Once again, the system is flawed in the number of steps involved and the extensive amount of human intervention.

The current systems do not allow for preparations for goods and services prior to a user's arrival. Furthermore, the current systems still rely on a cumbersome cash transaction. There are no tools offered to give a service provider advanced awareness of the full package of goods and services that a user would like to redeem at the service provider's location.

Limited Goods and Services

Due to the nature of the current systems, a limited offering of goods and services are available. Typically, a user can only selects from goods and services offered at a location at the moment of redemption. However, desired goods and services may not be offered at that location. Without a system involving a prior notification of user's wants, goods and services are not shipped or transferred for redemption prior to a user's arrival.

A solution is needed to enhance the patron's whole experience of not having to wait in extended lines. Moreover, a system allowing for the prior notification of goods and services benefits both the user and service provider. The user is able to redeem products in a more prompt manner while the service provider gets advance notice of what the user desires.

OBJECTS AND ADVANTAGES

Accordingly, several objects and advantages of my invention are avoidance of extended queues at a venue or entertainment park, the confirmation of redemption for goods and services with minimal human involvement, the pre-notification to a service provider of desired services and goods, and offering a tool to the user to reserve goods and services well in advance of actual redemption.

No Extended Queues

The invention provides a means of expediting a user through physical queues with a reservation system allowing the pre-notification to a service provider of the user's intent to redeem goods and services. With the pre-notification of desired goods and services, a service provider has time to assemble goods and services so the user need only to be presented with the goods and services upon a brief transaction. Moreover, with the pre-notification of users' orders for goods and services, the invention can make arrangement towards allocating users to locations of redemptions. For example, the invention has means for either establishing a sequential order for the redemption of goods and services or provides the users with a timed itinerary of redemption windows. These windows provide a user with time frames for when the user may gain access to goods, or for services, a deadline for when redemption must happen by. Both scenarios allow for the allocation of users to goods and services in order to minimize queue wait times by allocating users to different sequences or time windows.

Priority Queues

The invention is a method and system for managing admission to an attraction that could provide a customer with a choice of standing in a traditional first-come, first-serve line for an attraction or having a spot reserved for admission to the attraction without standing in the line for those persons without reservations. For VIP members or guests who pay a premium, the added value service would ensure both a quality experience and efficient use of the users' time.

More Time for Other Activities

Through these accomplishments, the user increases the amount of activities the user is able to participate in, given a limited time frame. For a price structure which includes a fixed fee for access to many goods and services, the user is more satisfied at having the time to interact with more activities. For an activity such as movie viewing where the schedules are on a fixed time schedule, an expediting experience through queues means a better chance at securing a best seat for the enjoyment of the feature presentation. Moreover, the sooner the user gets to the user's seat, the more likely the user will get to participate in any pre-show entertainment, instruction, or advertising.

The service provider also benefits from servicing users is a more timely manner. By minimizing user wait times, other services not included in the original fee, can be offered to the user, allowing more revenue to be generated for the service provider. Moreover, a more pleasant experience resulting from a limited amount of wait time may result in a loyalty to the service provider due to that advantage over any competitor.

Confirmation of Redemption

The invention has the ability to compare data regarding a reservation of good or service with an identification device carried by the user. When the identification data of the identification device and data regarding the reservation at a venue confirm an association, the system is functionally confirming redemption. The existence of the user at the location of redemption by the system assumes that a human or machine will follow with the providing of good or service, and a confirmation of fulfillment is processed by the system.

Through this object, the system can attribute reservation data with information of a payment or non-payment, or refund of a service, based on the confirmation or non-confirmation. Moreover, due to the system registering the confirmation, a minimal amount of human intervention is needed. There is no order taking or money transaction, simply the presentation of goods and services upon reservation confirmation, and possibly a receipt provided to the user regarding the transaction.

The invention allows for the confirmation of redemption by having an interrogator session in front of each of the redemption centers prior to goods and services fulfillment. With the invention, an accountability system for service redemption such as content viewing is finally made possible. A time and date stamp from an interrogation prior to the user's entrance into an auditorium or venue and time and date stamp from an exit interrogation would record the duration of a user in front of a screen or show.

Pre-Notification to Service Provider

The reservation system is a means to notify the service provider of a user's desire prior to user arrival. The advantages of this pre-notification include the ability to offer the user more goods and services. With the ability of knowing well in advance of a user's desire, goods can be shipped from another location before the user arrives for redemption. Moreover, the goods and services can be prepared prior to user arrival. Currently, service providers wait on the user for an order and afterwards prepare goods and services. In the object, at a movie theater, the user may want to eat Chinese food during the feature. While typically not on a movie theater's menu of offerings, the pre-notification allows the theater to order Chinese food and have it ready before or to coincide with the customer's arrival.

In a theme park context, the ability to be pre-notified of user activities is invaluable. For example, while a theme park may have a maximum capacity threshold, there is no data that is indicative of what a user will be doing inside a theme park resulting in poor service to all users in a theme park. All user's may be there for a only handful of attractions resulting in a horrible experience at those attractions while the other seventy-five percent of the park waste away in idleness. A threshold number based on a metric such as maximum capacity of desired attractions over a time period to limit access provides a much better experience for users. Thus, based on efficiency goals of a theme park, the invention is a great tool towards limiting the amount of users that can be let into a theme park or the maximum amount of users that can partake in an individual attraction per hour or day so the quality of users' experience is maximized. The invention could take all registered users, provide them with an itinerary and evenly disperse them among the attractions and throughout the operating time of the theme park.

Tool to Reserve Goods and Services

With the ability to reserve goods and services, users are not only able to select from a more myriad of selections, but have a better idea of what to expect of their experience. The invention has a means of doing complete itineraries of how a user's day or evening should transpire. This includes information such as what goods and services will be redeemed, possibly the order of redemption, and could also include a time period for redemptions.

Contingency Plan

The invention is a better way of tracking redemption allowing for a great implementation of a pay for use method of billing. Because of the system's ability for tracking redemption, a contingency plan could be in place so a user will not have to pay for services that may be down or a plan in the itinerary could be in place to have a back up for a reserved good or service scheduled at another time when the good may be available or service may be in operation again.

Current System Abusers

With the invention's assignment of a unique identification to a specific user, the invention ensures that a user can use the system as it was intended. Currently, goods and services sold over the Internet are subject to abusers who reserve or buy a massive quantity of the goods and services with intent to resale to other users with a premium mark up and unfairly take advantage of other users and the systems put in place. For example, these abusers use software programs to reserve or purchase a massive quantity of concert tickets in hopes of auctioning the tickets at a premium. The current invention assigns a single identification article per account which avoids the problem of potential abusers who would want to buy blocks of a service and good and subsequently transfer to another user at a premium price. An account requirement that follows the user to a venue for redemption ensures the user is fairly using the system.

On Site Location Tracking

The invention allows for the automatic notification of patron arrival at a venue. Interrogators placed at the entrance of the venue would notify the system of the user's arrival prompting the system to notify the goods and services fulfillment system into final preparation for further minimization of waiting a user must go through.

My invention allows users to pre-register their intent to consume from a remote location such as their home, work, or car using different types of communication network options. Their reservation of goods and services prior to arrival at the location for redemption allows the service provider to prepare goods and service prior to user arrival. With the confirmation of their reservation through an identification device, the user can redeem their goods and services with minimal effort. No verbal instructions are given to any employee and no cash transactions are needed. Just a presentation of the identification article for reservation verification and the presentation of goods and services can follow. All of this is done with the goal of expediting the users to their seats, final destinations, or attraction.

Further objects and advantages of my invention will become apparent from a consideration of the drawings and ensuing description.

SUMMARY

The present invention is directed to a reservation system and method that is both time saving and convenient. Accordingly, the system according to the present invention includes some or all of the following major components: a package builder for generating priced packages, a computer mediated communications network for sending user data, goods and services data, and transaction data to the package builder, a package manager for receiving the priced package from the packaged builder and for sending the priced package to the computer mediated communications network, an event builder for generating event queues, a computer mediated communication network for sending user queues, goods and services queues, and transactions queues, a queue manager for receiving the queues from the event builder and for sending the queues to the computer mediated communications network, and an interrogation process and system for confirming the redemption of goods and services.

The interrogation system includes some or all of the following components. Queue data regarding a user's reservation including, goods, services, and transactions, an interrogator connected to a computer for comparison of reservation data to a unique identification, and a machine readable label comprising a unique identification.

The package builder according to the present invention preferably includes a user's selections data storage coupled to a price generator for generating a priced package according to predetermined rules and profile definitions contained in a transactions' data storage. Also, the package manager includes a priced package storage for receiving the priced packaged from the package builder. The priced packaged storage is connected to the computer mediated communications.

The event builder according to the present invention preferably includes a user's priced package data storage coupled to a queue generator for generating event queues according to predetermined rules and profile definition contained in an event builder's storage. Also, the queue manager includes event queues storage for receiving the event queues from the event builder. The event queue storage is connected to the computer mediated communications.

The computer mediated communications network preferably includes an application server connected between a plurality of subscribers and the package and queue managers.

An object of the present invention is to provide a system for remotely reserving goods and services through a computer mediated network including a package builder for gathering data about goods, services, users and transactions, combining the information gathered with predefined rules, and outputting a priced packaged resulting from the combination, and a package manager for receiving the priced packaged and sending the priced package to a user client. The package builder includes a goods and services selection storage coupled to a price generator for generating the priced package according to predetermined rules contained in the selections data storage.

Another object of the present invention is to provide a system for remotely reserving goods and services through a computer mediated network including an event builder for providing event queues to a remote location, using data about goods, services, users and transactions from a priced package and outputting queues to a queue manager, the queue manager including a queue storage which receives event data queues from the event builder. The event builder also includes priced package storage coupled to the event generator storage for generating the queues according to predetermined rules contained in the selections data storage.

The system according to the present invention also includes a method for confirmation redemption where a user receives reserved goods and services at a location that is remote from the location the reservation was placed. A managing server distributes event queues to computers that are responsible for services and goods fulfillment. Those computers hold the queues regarding goods and services they are responsible for. The queues are held in the computers until an interrogator coupled to that computer reads a machine readable label with identification data that matches event data in the queues. Upon a confirmation match, the goods and services are released to the user.

The invention is a process for giving a user an identification device and relating the device to the user's account. The information is stored and passed throughout a network of computers. The user can use the identification device for redemption of goods and service with a prior reservation of the goods and services. The reservation and identification data work together in preparing the goods and services provider towards fulfill of the reservation prior to the user's arrival at the place of redemption.

Theses and other objects, features, and advantages of the present invention will become more apparent in view of the following detailed description.

BRIEF DESCRIPTIONS OF THE DRAWINGS

Figure 2:
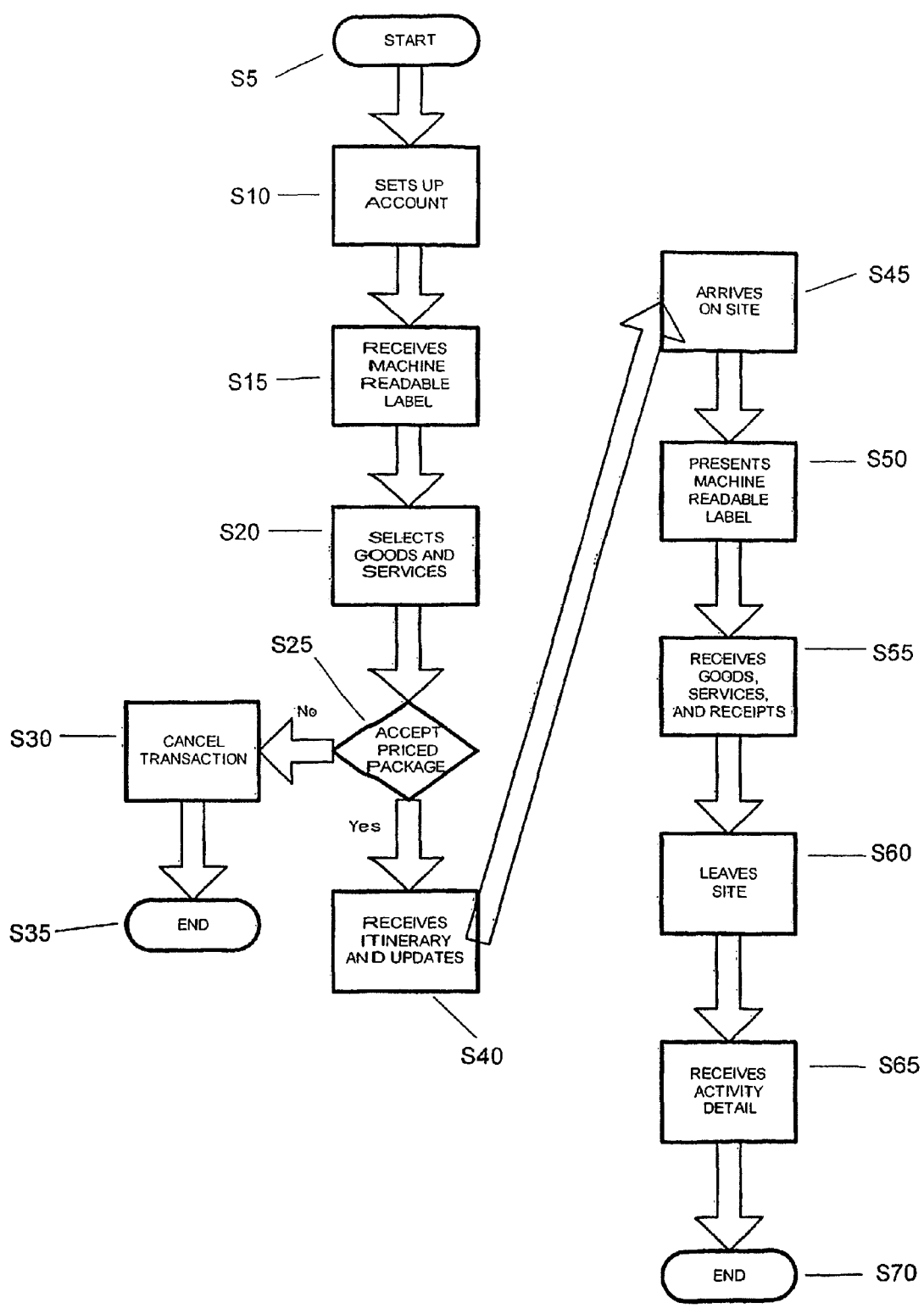
Figure 3:
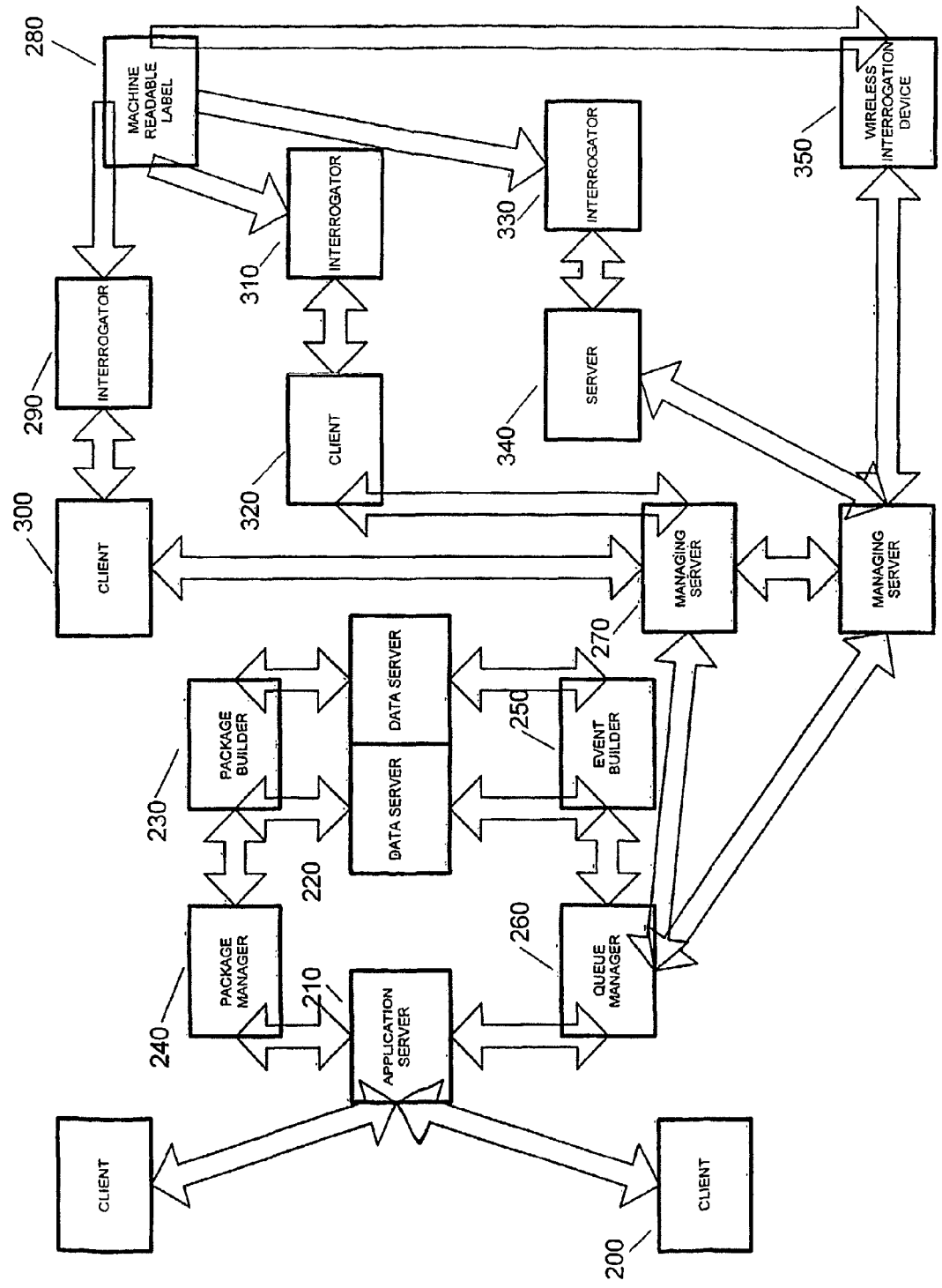
Figure 4:
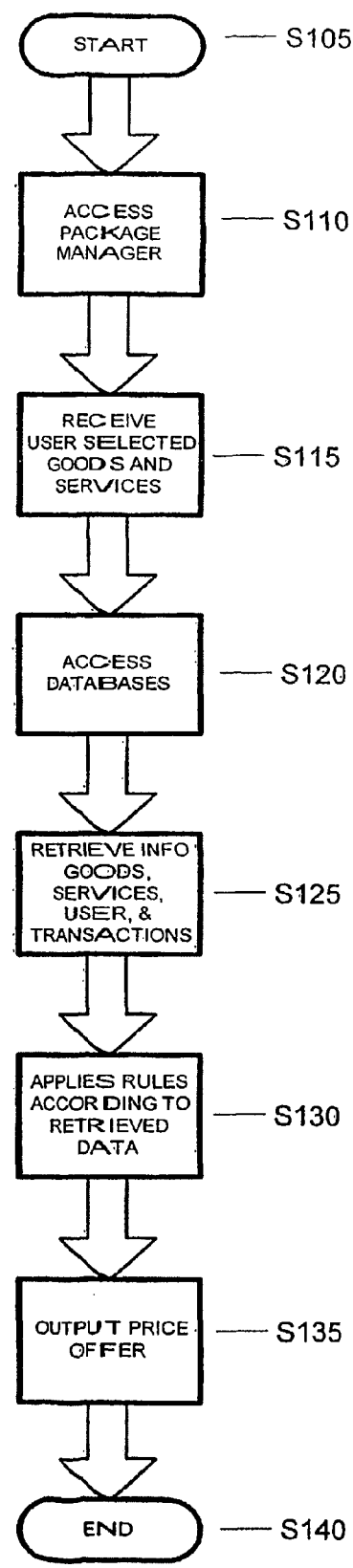
Figure 5:
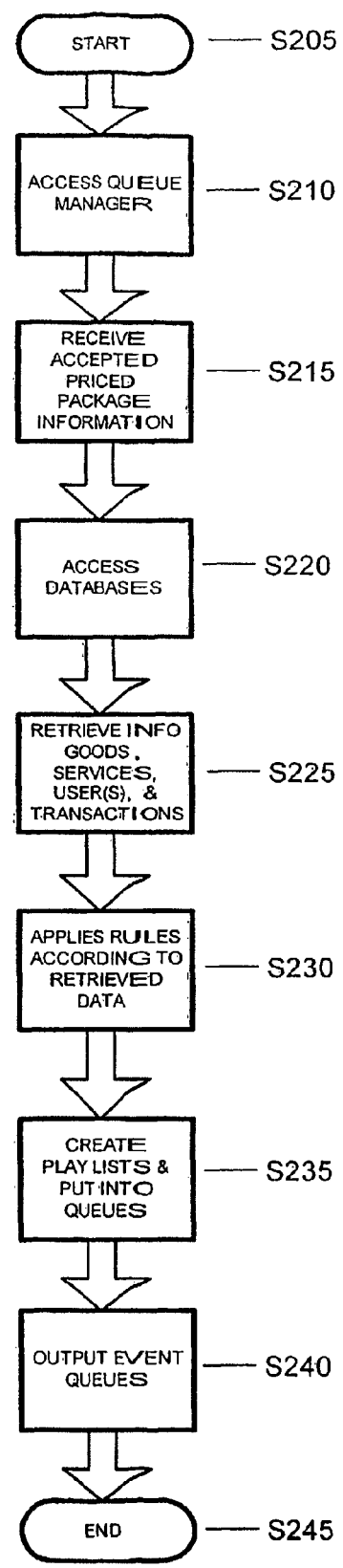
Figure 6:
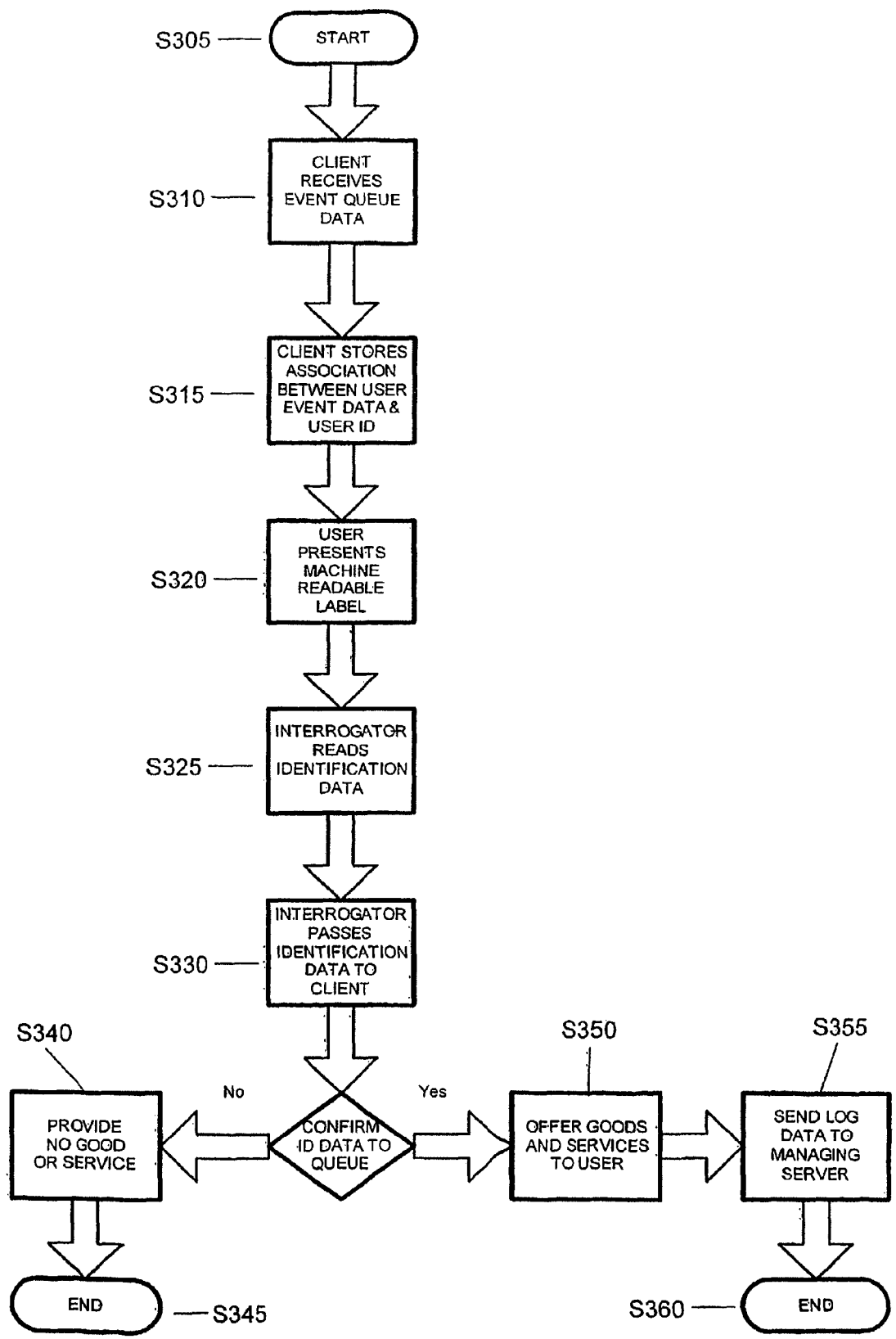
Figure 7:
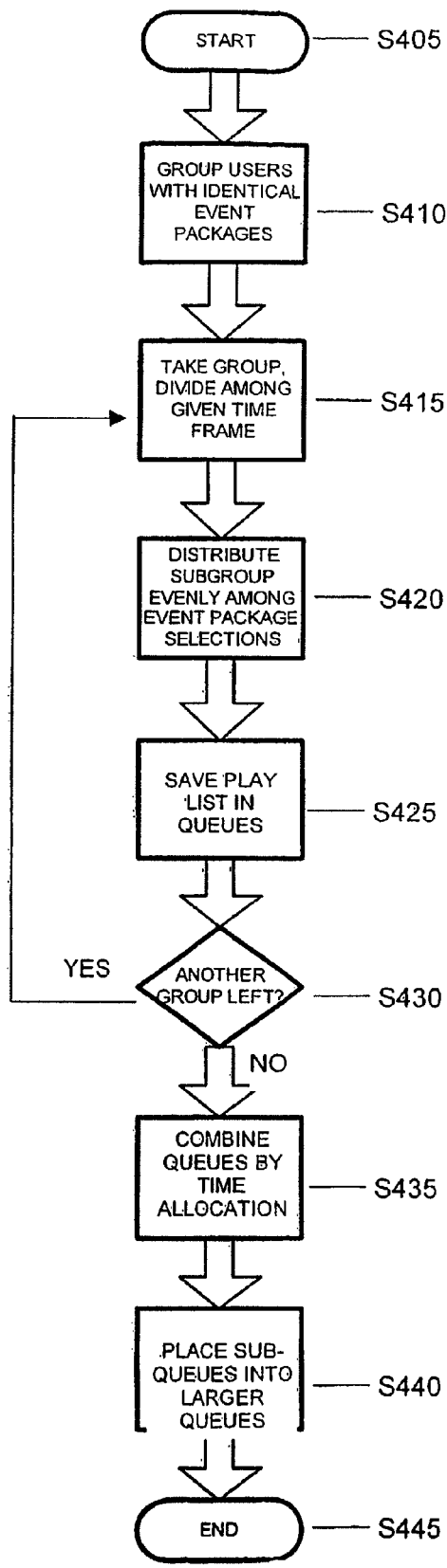

FIG. 1 shows an overall descriptive diagram of the system according to a preferred embodiment of the present system.
FIG. 2 shows a flow diagram of the user's requirements.
FIG. 3 shows an overall block diagram of the system according to the operation of the present system.
FIG. 4 shows a flow diagram of the package builder.
FIG. 5 shows a flow diagram of the event builder.
FIG. 6 shows a flow diagram of the redemption method.
FIG. 7 shows an embodiment of the polling means.

DRAWINGS

Reference Numerals

5 CLIENT
10 WIRELESS CLIENT
15 INTERNET ACCESS
20 WEB SERVER
25 APPLICATION SERVER
30 DATABASE
35 WORKSTATION
40 ROUTER
45 SWITCH
50 BOX OFFICE POINT OF SALE 1
55 BOX OFFICE POINT OF SALE 2
60 MANAGING SERVER 1
65 MANAGING SERVER 2
70 CONCESSION POINT OF SALE 1
75 CONCESSION POINT OF SALE 2
80 SWITCH
85 AUDT. 1 AUDIO PROCESSOR
90 AUDT. 1 VIDEO PROJECTOR
95 AUDT. 1 MEDIA SERVER WITH INTERROGATORS
100 AUDT. 1 ACCESS CONTROL TURNSTILE
105 AUDT. 2 AUDIO PROCESSOR
110 AUDT. 2 VIDEO PROJECTOR
115 AUDT. 2 MEDIA SERVER WITH INTTERROGATORS
120 AUDT. 2 ACCESS CONTROL TURNSTILE
125 AUDT. 3 AUDIO PROCESSOR
130 AUDT. 3 VIDEO PROJECTOR
135 AUDT. 3 MEDIA SERVER WITH INTERROGATORS
140 AUDT. 3 ACCESS CONTROL TURNSTILE
145 NETWORK MONITORING PDA
200 CLIENT
210 APPLICATION SERVER
220 DATA SERVER
230 PACKAGE BUILDER
240 PACKAGE MANAGER
250 EVENT BUILDER
260 QUEUE MANAGER
270 MANAGING SERVER
280 MACHINE READABLE LABEL
290 INTERROGATOR
300 CLIENT
310 INTERROGATOR
320 CLIENT
330 INTERROGATOR
340 SERVER
350 WIRELESS INTERROGATOR

PREFERRED EMBODIMENT

A preferred embodiment of the overview of the system is shown in FIG. 1. As shown in FIG. 1, the system includes 3 major locations: the END USER ACCESS TO INTERNET, the OPERATIONS CENTER, and the CINEPLEX. Implemented as a whole, the locations provide a mechanism for the reservation of goods and services at a venue location.

A user would submit account information from a client computer 5, 10. A server computer 25 assigns the account RFID (radio frequency identification) data to associate the user account data with a RFID device (not shown) containing the identification data. Then the user would receive the system provided RFID device, the data in the device uniquely identifying the account associated with the user. While the user may access his/her account using a login and password, the RFID device is the only thing required when present at an enabled computer to access account information. For the account, the user would have submitted personal information including financial, demographic, and preferences through a communication network. Besides a RFID device, the machine readable label could just as easily be a smart card, card with magnetic strip for a swipe reader, or a bar code. The machine readable label could be affixed to articles including jewelry, bracelets, watches, necklaces, rings or affixed or embedded to personal mobile devices such as a cellular telephone, personal digital assistance, or a portable gaming device.

After procurement of the RFID device to the user, reservations for goods and services may be made through an Internet enabled device 5, 10. After logging in to a website, the user would go to a webpage for an offer of goods and services that can be redeemed at the CINEPLEX. The selection of goods and services need not be actually at the CINEPLEX at the time of selection because of the possibility of shipment of any requested goods or services.

The products and services are offered for selection with information describing the goods and services. Product and service data could include information regarding location of redemption, a time or time window of redemption, and whether the product or service would be a consecutive redemption during the same visit to the CINEPLEX. As an incentive for consecutive redemptions, a discount rule could be provided. Moreover, the user sequence of selection or submitted ratings could suggest the order the user would like to redeem the goods and services. While the system may not provide a guarantee, the system could allow a first come, first service fulfillment rule concerning the order of redemption.

Based on descriptions of various video content, the user selects a group of advertising pieces to view prior to the movie according to interest in the products or due to the interest in the ads themselves. As an incentive for arriving early to view the selections, a discount could be given for the next visit upon the confirmation of viewing of solicitation material from a prior visit. The selection of video pieces such as advertising would be treated as a vote or recommendation for viewing. Due to limited amount of time and the large quantity of patrons in places such as a movie theater, a voting system would assist in maximizing the requests of a majority of users in an auditorium. In a given time allotment for a preshow, the most popular by vote, advertising would get selected for playback.

The user then selects possible movies, using information including location and time, to view as well as any post movie content of interest such as movie videos, possibly related to the soundtrack of the movies. Once again, the selections of a group of users are used to determine which movie would ultimately play. Given the choice to select from a library of movies, the theatre owner can rest assured that the movie that "wins" the selection poll will have the maximum amount of users in the auditorium. Given the choice of the same movie at different times, a user could rank his\her time preference to assist the system in accommodating the user or once again, the most popular time selected by a group of users could win for playback.

Goods and services that are individual in nature are not subjected to the system's polling system. Thus, the user would then exercise his/her desire to select concession items, posters, or other entertainment paraphernalia for pickup at the CINEPLEX.

For usage of the service by a minor, a parameter could be set up by an adult regulating what selections can be made by the minor. Moreover, a limit on a dollar amount for a package could be made regulating a minor to an allowance for any given event activities.

After the user submits all desired selections, the system uses a package builder for generating a price. Based on all of the user's selections, a price offer is made for the package built by the user. While each individual item has a "a la carte" price, the combination of goods and services results in a discount percentage that increases with each incrementally added good and service, as well as offering a discount based on solicitation material that was watched or reviewed by the user during a previous visit to the CINEPLEX.

After price offer data is generated by the system server 25, the price offer is sent back to the client 5, 10 for acceptance, rejection, or change.

The acceptance of the price package offer by the user could then either move monies from an existing balance in the account or prompt the user for monies to pay for the priced package.

The acceptance of the priced package would also trigger the preparation of goods and services for redemption at the CINEPLEX. First of all, physical goods not in inventory at the remote location could be shipped to the CINEPLEX. Moreover, data concerning all aspects of the priced package is fed to an event builder that builds the movie going experience.

After a cut off time period, all users will be fed into the event builder. For services such as content playback, namely the advertising, movie, and music video selections, the selection are actually treated as a vote for play back at the venue. The event builder takes all users registered for a date and time of the movie going experience and polls their content selections. The content selections with a majority are given priority for play back. In effect, the content pieces with the most "votes" win for playback at the CINEPLEX.

An application server 25 in the OPERATIONS CENTER comprises an event builder that compiles information about the goods and services as well as all details of an event into event queues. Event data are organized in sequence so as to facilitate the execution of an event. Separate queues are built for different aspects of an event, such as instructions to staff, instructions to user, and instruction regarding goods and services in reservation. Therefore, the event builder could have a queue built for concessions placing all users in the same queue with expected arrival time at a given time frame. Moreover, the queue could be divided to allocate users to different concession stations to increase efficiency.

Once the event is built, all data regarding the event including users is forwarded to the CINEPLEX where the event is taking place. At this point, the system would communicate by email to an internet enabled device 5, 10, the itinerary of the event to the user. FIG. 2 is a simplified flow diagram of the user's experience in using the system.

The user first sets up an account with the system S10. After the system assigns a unique identifier to the account, a machine readable label containing the same identification data is provided and the user receives the machine readable label S15. The user then accesses the system and selects goods and services he/she wishes to purchase S20. The system generates a priced package offer for the goods and services and the user can either accept or reject the offer S25. If the user rejects the priced package, the transaction is cancelled S30. After the user accepts the priced package "yes", the user will receive an itinerary and updates regarding the fulfillment of the purchase of goods and services S40. According to the itinerary the user would then show up at the site of redemption S45. For the presentation of goods and services, the user must first present the machine readable label for interrogation S50. Upon the correct association of unique the identifier to the account with reservation, the user receives the goods, services, and receipt of the transaction S55. After the user leaves the site S60, the user will receive an electronic confirmation of the details of the previous activities S65.

Data may be organized at the OPERATIONS CENTER or other locations before being shipped to the CINEPLEX for the redemption component. For example, the customization of any media including literature and digital media, or the customization of any bouquet of goods would be assembled together based on the user's selections. Once completed, the goods and services could be physically shipped to the CINEPLEX for redemption. Moreover, a user equipped with an Internet enable device such as a cell phone could continually receive status updates either hourly, quarterly, or up to minute as far as the status of the fulfillment of the itinerary including the readiness of the next item on their itinerary. This could continue until the end of the user's event. The itinerary could be to guide the user either by giving the order of redemption for goods and services or provide time windows for redemptions of goods and services. Furthermore, the itinerary could specify at what locations, within the CINEPLEX, goods are services are to be redeemed.

As the user walks into the CINEPLEX, an interrogation would be made by an interrogator placed above the CINEPLEX'S entrance. The interrogator reads the identification data from the RFID device and uses the identification data to query the queue databases. The queue databases would move that user's event information to the system attention, notifying all goods and services providers that the user is onsite and will be expecting redemption of goods and services shortly. This is the way of notifying all clients and servers that the user is on site and will be ready to redeem goods and services promptly. This initial interrogation would lead to instructions to the system's hardware, the system's software and staff on site to move each respective component towards final product and service fulfillment of the user's event. For example, a person working at concessions would begin scooping popcorn and pouring soft drinks. Other computers responsible for services could begin loading software or start running a system check for health status. A negative health status would be relayed back to the central system as a way of indicating that the user will be unable to redeem the goods or service and the user's account should be credited for this instance.

Other locations could also be equipped with interrogators for the confirmation of the redemption of goods and services. The user would bypass any physical queue with a person verbally taking orders for goods and services, i.e. the non-reservation queue. A presentation of the RFID device would be enough information for the presentation of goods and services because all necessary details such as the identity of the user would be displayed on a display device from query results generated from the RFID presentation.

The preferred RFID device would be capable of environmental feedback behaviors. One such behavior is a vibratory setting that could be paged, activated by radio frequencies transmitters in a venue as an alarm to move the patron to different locations within the venue. For events which involve services at multiple stations, the tool would prove valuable to alert users to move according to the itinerary or to help the user to adhere to general time frame for redemptions.

In the preferred embodiment, an usher attends to a RFID reader at the entrance of the auditoriums' corridor much like the ticket taker in current systems, the difference being that user oversees a display device to ensure the patron has a reservation for any of the movies currently playing in the auditoriums. This allows a single person to assist all patrons at the theatre instead of having personnel at each of the auditorium entrances. Having cleared the corridor reader, the patron would proceed straight to the auditorium where an RFID reader would confirm reservation in the queue database to the RFID device's unique identifier and grant auditorium access to the patron. Access control would be done by a turnstile 100, gate or other means that are used to control access. Moreover, unauthorized access such as minor attempting to sneak into adult fare or a patron movie hopping could set an alarm off after the RFID reader interrogates a RFID device with invalid reservation match.

The RFID interrogation at the auditorium entrance would also serve as a notification to the staff that the patron is inside the auditorium. A member of the staff would see this on a display device and proceed to the auditorium for a handover of goods that were reserved. The staff member would have an all access RFID article for admission to the auditorium. Once inside, the staff member would hand reserved goods to the patron, verifying identity through a handheld RFID reader and would also input into the handheld computer, the location of the patron in the auditorium. A receipt of the transfer of goods would be given to the patron. The handheld computer would also be communicating wirelessly to the computer mediated network to record the confirmation of the redemption of goods by the patron.

For the confirmation of service, such as the viewing of content, the RFID interrogation session at the entrance of the auditorium would be capable of a time and date stamp marker as indication of positive viewing of any content by the RFID device holder, logging content that plays after the time/date stamp.

Closer to the main feature or during a different segment of the content playing service, a staff member would return to the patron to pick up trash and to hand over any other snacks or desserts for consumption during the next segment. Thus, according to the itinerary, a pre-feature snack could be followed by a feature presentation snack. Having recorded the location of the patron, the staff member would be able to find the patron with minimal distraction to surrounding patrons. Once again, a RFID interrogation and receipt presentation would consummate the transaction.

Should the patron need to exit the auditorium for a period, the RFID reader would once again be used to grant access out of the auditorium. Another time/date stamp would be recorded to log what content is playing and where the content is at for tracking of content viewer ship. The system would no longer be counting that viewer as a participant in content viewer ship for ads that play during the viewer's absence.

Upon completion of all on site transactions, the remote managing server 60 sends back to the central database 30 all data regarding transactions, including reservations having been fulfilled and reservations not having been fulfilled. The databases regarding transactions and user data would update for record keeping and profile building.

An automatic receipt generator would generate an electronic receipt to be emailed to the patron for reviewing of activities, statement balance, possible feedback on consumed goods and services, and for selling of other related goods and services to those previously consumed.

The application sever 25 would be responsible for compiling all the returned information into a reporting tool for third party vendors interested in seeing the consumption of their goods and services. Any feedback from the user regarding quality or recommendations for a better future experience could be incorporated into this reporting tool.

Operation of Invention

An embodiment of the overview of the system is shown in FIG. 3. As shown in FIG. 3, the system comprises three major subsystems: the package builder, the event builder, and the confirmation of redemption. Implemented as a whole, the system provides a mechanism for the reservation of goods and services at a remote location.

A user, using a client computer 200, accesses an application server 210 and creates an account. The system stores all user information creating a profile, including login and password for future usage of the account. After the user is registered with the system, the server system assigns an identifier to a machine readable label 280 and associates the assigned user identifier to the user account. The user receives the identification article 280 and the system can be used with the identification article 280 as a means for receiving goods and services.

Through a computer mediated communication network, the user logins to a website through the client 200. At the back end are several databases 220 including information about goods, services, user information, and transaction information. The application server 210 communicates to the client 200. The client 200 displays an offering of selections for goods and services that can be redeemed at a venue to the user. The user selects a combination of goods and services for redemption at the remote location. After submittal of selections for goods and services to the remote application server 210 from the client 200, a package building engine 230 takes all of the selections, combines data about the user including past transactions from the databases 220, and presents a price offer for the user selected package. FIG. 4 is a simplified flow diagram of the package builder's activities.

The package builder first relies on the package manager to provide information regarding the user's selections S110. The package builder then receives the information from the package manager S115. The package builder then accesses the databases for more information regarding the user's selections S120. The package builder retrieves information from the databases regarding goods, services, user information, and transactions S125. Based on all of the information gathered, rules are applied, for example, discount rules, regarding the method of pricing the user selected package S130. The package builder then outputs the resulting price offer data to the package manager S135.

The price building component 230 is set by rules which results in an incrementally discounted price according to the increase in number goods and services selected, as well as considering user information such as profile information and historic data such as past transactions. Thus, a user with the maximum amount of goods and services selected as well as a history of redemption of the maximum amount of goods and services at a remote location will be presented with a maximum discount when defined by those definitions. The price offer is sent by the package builder 230 to a package manager 240 which is charged with sending the price offer back to the user's client 200 for acceptance or denial by the user.

Upon acceptance of the price offer, the user is prompted for method of payment. The client 200 can either submit payment information or submit the permission to use payment information currently stored in the account. The application server 210 receives the confirmation of acceptance from the client 200 and passes this information to an event builder 250. The acceptance of the price offer and following payment by the user is treated like a reservation of goods and services, and all of the corresponding data is presented to the event builder 250 to build the event.

Once again, the databases 220 housing the information about users, goods and services, and transactions are accessed, this time by the event builder 250. FIG. 5 is a simplified flow diagram of the event builder activities.

The event builder accesses the queue manager S210. The event builder then receives the accepted priced package information S215. The event builder then accesses the databases S220 and retrieves information regarding goods, services, user(s), and transactions S225. Having gathered all relevant information, the system applies rules towards building the event based on the information S230. The event builder then creates play list queues that contain instructions for how and when goods and services are to be redeemed S235. These queues are then outputted to the queue manager S240.

The event builder 250, using the parameters in the priced packaged, gathers the relevant details, combines the information and using predefined rules outputs event queues. The queue manager 260 receives these queues from the event builder 250 and transfers the information to a remote server 270 for system usage. The event builder 250 is responsible for the building of event details for the individual user as well as event details for a group of users participating in the same event. For example, users selecting the same time, date and location for a service which is best serviced to a group of users would be considered as a group event and the details would be shared by everyone in the group. The event builder 250 builds these details by allocating goods and services to separate queues. For example, a separate queue's data would involve product redemption at a specific product station at a venue. Another queue's data would be used for service redemption at a different station at the same venue.

Some queues pertain to individual redemption of goods and services. For example, goods and services that are individual in nature such as concession items, retail items, and services that only allow one user to be serviced at a time. Some services can be treated as either an individual services or group service. Video gaming is an example where the service is either reserved for a single player or more than one player.

The queues pertaining to group redemption of goods and services such as attractions, movies, and rides are such that they contain information that can accommodate a group of users at a time. The polling function in the event builder 250 is responsible for this type of queue. The event builder 250 has a means for polling a plurality of users and their selections from all of the priced packages received and outputs queues and orders the queues based on the poll. For example, users could select a group of advertising ads they wish to view prior to the main feature of the evening. Due to a time restraint and a limited amount of possible selections, the polling function tallies up the number of advertising selections made by users in the same event. The advertising pieces with the greatest majority would be given priority over the advertising pieces with minority selections. Furthermore, the polling could be based on the information regarding a selection. For example, content pieces could be ranked or given a priority number by the users. Thus the polling function would take into account both the selection and any of the weightings, rankings, or description associated with it.

The result of any of these types of group polls is a play list queue. This means allows for a plurality of users to dictate the selection and order for a play list for a live concert, for content regarding product information, for content regarding educational programming, for music videos, for video gaming, for movie viewing including a collection of short films, for karaoke, for a sporting even or for access to computers with services such as the aforementioned ones.

The event builder 250 creates definitions by using database selections criteria for allocating products and services to users in an event. Such definitions include the aforementioned one, where a service such as content viewing is polled to determine the play list via selection popularity. Another possible definition is where queues are used to distribute users to similar goods and services as a means of preventing a backlog of users in a single physical queue waiting for the same good or service. The efficient allocation of users among all goods and services allows the system to offer goods and services to all users in a limited time constraint. By the generation of play list queues for the users, users can be allocated to services and goods at a specific time or using a specific sequence, allowing an intelligent means of servicing a large population of persons over a limited amount of goods and services offerings. The play list queues are used to allocate users among different places in a venue for redemptions in a limited time frame. In this usage, the system users would be provided with a play list as an itinerary of the selections and order for the redemption of selected products and services preventing a single good or service to be overwhelmed with all users in a venue.

Queues could also be responsible for holding the play lists queues, an instance of queues holding queues. Using the data of the play list, the system further works towards reservation fulfillment. The data inside the generated play list are triggers for moving to the remote location corresponding content, software commands, hardware commands, media playback instructions, software and hardware polling instructions, auditing instructions, logging and recording instructions, instructions for moving onsite goods, services, and data, instructions for employees, and instructions for the users.

The queues prepare a location for the arrival of the user. The queues can contain information regarding goods and services that a user is expecting to redeem at a remote location. For example, goods and services offered to a user need not be on site until a request of the items is sent by the system through the queues. Information from the queues could notify third party vendors ordering systems to forward goods and services to the remote location for user redemption. Thus, inventory and other types of services such as food could be kept at another location until the event day. Thus, fresh goods and services would be transferred from an off site location to the redemption location the day of planned redemption or shortly after the reservation is placed. Besides instructions for moving goods, services, or data, the queues could contain data comprising of content, software commands, hardware commands, media playback instructions, software and hardware polling instructions, auditing instructions, recording and logging instructions, instructions for employees, and instructions for the user.

After the event builder 250 builds the queues for an event, the queue manager 260 receives the queues and forwards the queues to the remote locations responsible for fulfillment of the reservation. Upon the queues arrival to the site, a managing server 270 further distributes the queues to clients 300, 320 and server 340 that have relevancy to the queue information and specifically work towards that reservation's fulfillment.

For example, an event queue related to a specific roller coaster reservation would be sent to the server responsible for confirming that a user is at the location of the roller coaster. The queue data could contain information granting a user access to that roller coaster between a specific time frame. Moreover, a display device at the location could provide personalize information or instruction to the user after interrogation of the user's identification device. Furthermore, a receipt dispenser could provide the user with a receipt should the rollercoaster go down and the user requires a subsequent refund. Once again, queue data is the component necessary to make this happen.

The queues cover a ride range of event details from instructions to employees and users of the system, to hardware and software commands of systems that perform towards the goods and services fulfillment. The queues are distributed by the managing server 270 to the clients 300, 320, and servers 340 that are responsible for services and goods fulfillment. Through the use of queues, all of the queue holding systems 300, 320, 340 wait for the users to identify themselves as precursor to the presentation of goods and services. In a group event, a single person's machine readable label 280 interrogation could be enough to start the system towards goods or services fulfillment.

FIG. 6 is a simplified flow diagram of the method of goods and services redemption. At the location for goods and services redemption, client computers receive event queue data S310. The client then stores the queues which contain the association between a user's event data and the user's identification contained in the user's machine readable label S315. The user then presents the machine readable label to an interrogator that is connected to the client computer S320. The interrogator reads the identification data on the machine readable label S325. The interrogator passes this information to the client S330. The client uses its stored queue data to confirm whether the user's identification has a reservation for goods and services S335. If no association is found, the user does not receive goods or services S340. If an association for goods and/or services is found, the user is offered goods and services S350. After the client logs the association confirmation, the log is sent to the managing server S355.

The queues are used as a component towards user redemption. By the time the user arrives at the location for goods and services redemption, the queues are in waiting stage for the interrogation of the user's identification device, the machine readable label 280. Interrogators 290, 310, 340 are attached to each of the clients 300, 320 and server 350 responsible for the fulfillment of any given good or service presentation, interrogators 290, 310, 340 read the information on the identification device 280, sending the data to the client 300, 320 or server 350. The client 300, 320 or server 350 compares the identification data with data in the queues verifying that the user had a prior reservation for the good or service in question. Upon confirmation of the user to the reservation, presentation of the good or service is made to the user.

For example, an interrogation at a goods counter would let an employee know that a user is ready for their goods to be presented. After reading the machine readable label 280, the interrogator 290 queries the client computer 300 attached to the interrogator for queue data associated with the identification information housed by the machine readable label 280. The identification data with the match in the queue database confirms the reservation of the account user, authorizing services and goods to be presented to the user, and records the positive match with the confirmation of redemption by the user.

The positive match also acts as proof of redemption for the goods and services. For the viewing of content such as a movie, an interrogation session at the entrance of the auditorium would be coupled with a time/date stamp. This data would be compared to either what content is playing or the current running time of the content playing to verify viewing of the content by the user. If a user needed to leave prematurely, an interrogation session to let the user out would account to the user not viewing the content by relating the time of the exit interrogation session to the time properties of the current and any subsequent content.

The interrogation can affect the queues in several ways. After an interrogation session, the data in the queues could either be moved out of the queue, marked in the queue, or affected in such a way to signify a product fulfillment, a status towards the fulfillment of redemption, or any other indication that an interrogation session was performed with the user of the identification device.

Media playback systems are used for both the actual providing of services and the facilitation towards providing services. A media playback server can give visual instructions to the user or employees at a goods counter or be responsible for the playback of content the user has paid for viewing inside an auditorium. Automation systems tied to these servers could be responsible for the distributions of goods, access control for users, or environmental feedback effects such as lightning. Audio processors in these systems could be used for the audio communications of instructions to users and employees or be used for the audio presentation of playing content. The systems capabilities are multifaceted allowing for the functionalities of video gaming, reception of live audio and video feeds, educational applications, content playing, and the recording of data from an interrogation session.

Description and Operation of Alternative Embodiments

The second embodiment involves the use of the invention at a theme park and affiliated companies of the theme park. In this embodiment, the products and services offered can be expanded to goods and services redeemable at multiple venue locations with the rule of the priced packaged discount being offered as a result of using affiliated companies of the theme park. For example, the priced package discount could consider goods and services offered by an airline company, rental car company, and affiliated hotel. Thus, the user's machine readable label would be interrogated at many venues including the airport, car rental facility, hotel, as well as the interrogators within the theme park.

The event builder would produce itinerary data for products and services redemptions for the user to follow in the redemptions of the plane ride, rental car, and hotel based on the user's selections. The itinerary would contain a play list to guide the user in redemption of goods and services at the theme park. In this embodiment, the event builder can either give the user an order to follow in the redemption of products and services, give the user time windows in the redemption of products and services or both. Furthermore, for identical good and services offered in multiple locations, the itinerary would efficiently allocate users to those stations as to not overwhelm a single location. For use in the theme park, the user would get access to a second priority queue for goods and services for a more efficient usage of time. This service could be offered for a premium or as a reward for staying at a resort that sponsors the theme park. For products and services that are not queue dependent such as parades and public shows, the play list could provide "free time" for the user to veer from the itinerary in order for the user to participate in such attractions.

For use inside of the theme park, there is the capability to take users with identical goods and services selections and do an allocation of users across all products and services within that package resulting in even distribution in the park. FIG. 7 is a simplified description of how the polling function would work in this embodiment.

An embodiment of the polling function works by first grouping all users with identical event packages S410. Using a system provided time frame, the users in the group are divided evenly S415 and assigned among their event package selections S420. This play list information is then saved in queues S425 and the system checks to see if other groups exist with identical event packages S430. If affirmative, the system goes back to step S415 to divide the next group among a given time frame and repeats the subsequent steps, if not, the system combines the information in queues according to their assigned time frame S435. The sub queues are then placed into larger queues S440.

The assignment of a group of users per attraction over a time frame allows for attractions to have an evenly distributed population in each of the priority queues. This would be an efficient allocation of users who want to all do the same things, but ensuring them that they will not all be at the same attraction trying to do things at the same time.

In a preferred usage, the user would have back up time periods in their itinerary to return to attractions that may have been temporarily closed due to maintenance or inclement weather earlier in the day. The polling function could once again allocate users to time segments to disperse the backup users in afternoon time allotments. Again, no single time segment would contain a significant amount of system users more than the others waiting in the priority queue regarding a specific good or service.

As an example, the event builder would take all reservation users for a given identical package and divide the number of users by the operating hours of the day resulting in a quantity/per time period amount for the event package. Based on the parameters in the event builder, the system could set a ratio of scheduled time to back up time. For example, in a 12 hour day, the first 8 hours of operating hours could be dedicated to schedule the regular event itineraries, the last 4 dedicated to the back up. Thus, the polling system would take all users in an identical package, divide by 8 hours, and distribute among the selections for the first part of the user's play list, then take all users in that identical package, divide by 4 hours, and distribute among selections for the back up part of the user's play list. In the instance, the last 4 hours is half the amount of the first original 8 hours so selections may be double booked, but this time period is intended as a back up with the hope that the user will not need to use these back up periods and that the park was not afflicted with mass multiple attraction shut downs. The user would still have the opportunity to opt into the first in, first out line during their free period or potentially receive a refund if inclement weather affected both the scheduled time and back up time.

The free space of an itinerary could be used for participating in ad-hoc products and services that are desirable but without the requirement for a prior reservation. For example, a terminal could be set up for payment to use an attraction or service without using the reservation system. The user would simply make a payment and wait in the regular non-prioritized queue. Furthermore, in a scenario where free space is allocated evenly by placing an even amount of users over a given time frame into free space segments, the users in that segment could have all access to any priority queues, once again regulating who has access when to goods and services.

Thus, by first grouping all users that choose a particular package and then allocating that group over that itinerary and subsequently doing the same for the users in other shared packages, the system can effectively spread all users over attractions and operating hours of the attraction. Moreover, the allocation of users to a time period of back up provides that all users of the system can have a back up period for the redemptions of goods and services.

Another alternative embodiment involves buying groceries over the Internet. The user selects goods and services from a website and later picks up the groceries from a remote location. In a preferred embodiment, after a user submits the approval of the priced package offer, the grocer assembles the goods and subsequently transfers the goods to a satellite location. This allows a single warehouse to hold inventory and a number of satellite storefronts with limited inventory to be a convenient place for pick up while saving the grocer inventory space by having a single warehouse as the starting point where all groceries come from. Again, the storefronts would have all the system components to minimize transaction time, the user having already submitted payment through the internet.

Another embodiment involves the leasing of a number of computer programs and applications. After agreeing to a leasing price of user selected software, the different mix of computer software is assigned to personal computer(s) according to the system generated program builder. For example, to any venue with computers, a number of movies, games, or productivity software could be downloaded to computers in the venue according to a pre-selected order based on the users' desires.

Furthermore in entertainment venues such as casinos, where offerings are numerous and securing services such as a gambling table can be a challenge, a preset itinerary allows for the minimization of wait times for gambling activities, meal times, and live shows.

Lastly, the invention could be used in any recreational or workout facility to plan activities or an exercise routine for the benefit of maximizing the user's time.

What is claimed is:

1. A system for managing reservations of goods or services or activities and subsequent redemptions thereof at a remote site as an event, said site having a plurality of good or service experience clients or servers, each good or service experience client or server providing access to redeemable goods or services to multifactored authenticated users after interrogation, wherein at least one of said good or service experience clients or servers allows access to goods or services or activities that are not available at other good or service experience clients or servers, said system comprising:

a managing server;
the plurality of good or service experience clients and servers, said good or service experience clients and servers receiving data associated with the authenticated users and their reservations of goods or services or activities, said good or service experience clients and servers including one client or one server corresponding to reservation data in at least one good or service experience redemption window and having responsibility for allowing access to specific goods or services at said corresponding good or service experience clients or servers and for confirmation of redemption at said corresponding good or service experience clients or servers, said good or service experience clients and servers including an interface for communicating with said managing server, said good and service experience clients and servers accessing, from said managing server, a plurality of queues with information for fulfillment of individual goods and services, said queues including event queues identifying each good or service experience client or server within said remote site at which reserved goods or services are to be redeemed and identifying, when each good or service experience client or server is responsible for redemption according to a specific order of redemption or specific times of redemption;
a computer mediated communications network over which said good or service experience clients and servers and said managing server send and receive information;
a plurality of non-transitory portable devices in possession of said authenticated users of said system, said of non-transitory portable devices including machine-readable labels, each storing an identifier relating to an online account of an authenticated user;
wherein said non-transitory portable devices comprise a jewelry, a watch, a necklace, a ring, a bracelet, a mobile telephone, a personal digital assistant (PDA), a portable game system, a smart card, or other swip-able or insertable articles;
a plurality of interrogation devices responsive only to said machine-readable labels having said identifier for interrogating said machine-readable labels having said identifier, and causing comparison of said identifier with data in said queues to verify that each of said authenticated users have reservations, wherein:
said managing server grants access of said event queues to each good or service experience client or server which receives reservations from said event queues for an authenticated users of said good or service experience client or server, wherein said authenticated users are due for reservation redemption, corresponding to reservation data in at least one good or service experience redemption window, said managing server receiving said confirmations of redemptions from each said good or service experience client or server at which said authenticated users are granted access to goods or services corresponding to reservation data in the at least one good or service experience redemption window;
wherein said good or service experience client or servers include a plurality of point of sales clients, and a plurality of media playback systems, wherein each said media playback system includes a media playback server, public display device, automation systems, and an audio processor for providing services or access to goods and services to said authenticated users, and
said point of sales clients and media playback servers are connected to an associated one of said interrogation devices, wherein said point of sales clients and media playback systems receive data from said one interrogation device of said interrogation devices, wherein said point of sales clients and media playback systems are configured to associate and record event data with an identifier from one of said machine readable labels through use of said queues, and output data regarding a transaction, said clients and servers being configured to permit a authenticated user to complete transactions involving, said event data and said identifier on said machine-readable label; and
said point of sales clients and media playback systems connected to the associated one of said interrogation devices, execute audio playback, video playback, or environmental feedback after receiving data from one of said machine readable labels; and
said point of sales clients and media playback systems connected to the associated one of said interrogation devices, initiate a checking of reservation status on the good or service experience clients and servers corresponding with the good or service experiences redemption windows after receiving data from one of said machine readable labels; and said point of sales clients and media playback systems connected to the associated one of said interrogation devices, prepare for redemption, the goods or services clients and servers corresponding with the good or service experience redemption windows after receiving data from one of said machine readable labels.

2. A system for managing of an event in which a plurality of multifactored authenticated users are provided goods or services, after interrogation, for which the plurality of multifactored authenticated users have reserved for redemption at a site remote from said authenticated users, said site having a plurality of good or service experience clients or servers that provide access to redeemable goods or services, after said interrogation, wherein at least one of said good or service experience clients or servers provides access to redeemable goods or services that are not available at other good or service experience clients or servers, said system comprising:

a managing server; and the plurality of good or service experience clients and servers, accessing data from said managing server, said good or service experience clients and servers including at least one good or service experience client or server responsible for redemption of goods or services corresponding to reservation data in at least one good or service experience redemption window;

a computer mediated communications network, said computer mediated communications network enabling sending and receiving of information between said good or service experience clients or servers, and said managing server; and an event builder receiving data associated with many authenticated users and theft reservation of goods, services, and activities, said users having been authenticated by each user's online name and receiving an identifier, related to said online account, for a non-transitory portable device, said event builder assigning said data of goods, services, and activities to good and service experience redemption windows by using said data associated with authenticated users, or their reservations for goods or services or activities, and grouping at least one identical data set associated with said data of authenticated users, or their reservations for goods or services or activities, to allocate said authenticated users to said good or service experience windows; and creating and outputting event queues containing instructions for said authenticated users' redemptions of goods or services at said remote site, said event queues identifying each good or service experience client or server within said remote site at which each authenticated users' reserved goods or services are to be redeemed, after interrogation, and identifying when each good or service experience client or server is responsible for redemption according to a specific order of redemption or specific times of redemption; and said managing server receiving said event queues from said event builder, said event queues for use in providing for each authenticated user's redemption of goods and services, said managing server granting access for said event queues to each said good or service experience client or server having responsibility for redemption of said goods or services reserved for redemption by each authenticated user; and a plurality of non-transitory portable devices for said authenticated users, one of said non-transitory portable devices being in possession of said each authenticated user for identifying said authenticated user, the one of said non-transitory portable device having an identifier relating each said authenticated user and to said authenticated user's reservation of good or services at each good or service experience client or server in said remote site;

wherein said non-transitory portable devices comprise a jewelry, a watch, a necklace, a ring, a bracelet, a mobile telephone, a personal digital assistant (PDA), a portable game system, a smart card, or other swig-able or insertable articles;

a plurality of interrogation devices responsive to said identifiers, one of said interrogation devices being located at each good or service experience server or client within said remote site for interrogating said one of said non-transitory portable devices that is in said authenticated user's possession for confirming the identity of said authenticated user when said authenticated user is present at said site's good or service experience server or client by comparing said identifier with data in said event queues, said event queues accessed by said good or service experience server or client having been granted access by said managing server, and for associating said authenticated user with said goods or services according to said event queues accessed by said good or service experience client or server, and said good or service experience client or server having redemption responsibility according to said reservation data in a good or service experience redemption window, whereby said reservations for goods or services or activities associated with said each authenticated user are available to said authenticated user in an order of redemption according to said reservation data in the good or service experience redemption windows;

wherein said clients and servers include a plurality of point of sales clients, and said system further comprises a plurality of media playback systems including a media playback server, public display device, automation systems, and an audio processor for providing services or access to goods and services to said plurality of authenticated users, and wherein said point of sales clients and media playback servers are connected to a machine-readable label interrogator as one of said plurality of interrogation devices, receive data from said interrogator and are configured to associate and record event data with an identifier from a machine readable label through use of said queues, and output data regarding a transaction wherein goods or services or activities are redeemed at near said at least one specific good or service experience clients or servers, said clients and servers being configured to permit an authenticated user to complete transactions involving said event data and said identifier on said machine-readable label; and said point of sales clients and media playback systems connected to the associated one of said machine-readable label interrogators, execute audio playback, video playback, or environmental feedback after receiving data from one of said machine readable labels; and said point of sales clients and media playback systems connected to the associated one of said machine-readable interrogators, initiate a checking of reservation status on the good or service experience clients and servers corresponding with the good or service experience redemption windows after receiving data from one of said machine readable labels; and said point of sales clients and media playback systems connected to the associated one of said machine-readable label interrogators, prepare for redemption, the good or service experience clients and servers corresponding with the good or service experience redemption windows after receiving data from one of said machine readable labels.

3. The method and system according to claim 2, wherein said event queues contain instructions for said authenticated user's redemption of reserved goods or services or activities at multiple specific good or service experience servers or clients in said remote site.

4. The method and system according to claim 2, wherein said instructions contained in said event queues include instructions for vendors present at said remote site and vendors not present at said remote site to forward goods or services or activities near to said good or service experience clients or servers before authenticated users' arrivals.

5. A method for the managing of an event in which multifactored authenticated users are provided goods or services, after interrogation, that said authenticated users have reserved for redemption at a site remote from said authenticated users, said site having multiple good or service experience clients or servers, each good or service experience client or server providing redeemable goods or services after said interrogation, wherein at least one of said good or service experience clients or servers provides redeemable goods or services that are not available at other good or service experience servers or clients, said method comprising:

accessing by a plurality of good or service experience clients and servers data from a managing server, one of said good or service experience clients or servers receiving said authenticated users' reservations' data for goods or services or activities before each authenticated user's arrival, said good or service experience clients or servers including one client or one server responsible for providing redemption of specific goods or services corresponding to reservation data in at least one good or service experience redemption window;

sending and receiving information between said good or service experience clients and servers, and said managing server on a computer mediated communications network;

receiving, by an event builder data associated with said authenticated users and theft reservation of goods, services, and activities, said users having been authenticated by each user's online name and receiving an identifier, related to said online account, for a non-transitory portable device, assigning by said event builder said data of goods, services, and activities to good and service experience redemption windows by using said data associated with said authenticated users, or their reservations for goods or services or activities, and grouping at least one identical data set associated with said data of authenticated users, or their reservations for goods or services or activities, allocating said authenticated users to said good or service experience windows; and creating and outputting event queues containing instructions for each said authenticated user's redemption at at least one of said good or service experience servers or clients in said remote site at which said authenticated user's reserved goods or services are to be redeemed and identifying when each good or service experience client or server is responsible for redemption according to a specific order of redemption or specific times of redemption;

by said managing server, receiving said event queues from said event builder and granting access for said event queues to each said client or said server having responsibility for redemption of said goods or services for use in providing said authenticated user redemption according to said queues before authenticated users' arrival;

providing a plurality of non-transitory portable devices for authenticated users, one of said of non-transitory portable devices being in possession of said authenticated user for identifying said authenticated user, said one of non-transitory portable device having an identifier relating said authenticated user and to said authenticated user's reservation for redemption of good or services at said remote site;

wherein said non-transitory portable devices comprise a jewelry, a watch, a necklace, a ring, a bracelet, a mobile telephone, a personal digital assistant (PDA), a portable game system, a smart card, or other swip-able or insertable articles; and providing a plurality of interrogation devices responsive to non-transitory portable devices with said identifiers, interrogating by one of said interrogation devices being located at said remote site said one of said non-transitory portable devices that is in said authenticated user's possession; and confirming the identity of said authenticated user when said authenticated user is present at said good or service experience clients and servers by comparing said identifier with data in said event queues, said event queues having been access by said good or service experience clients and servers, said good or service experience clients and servers having been granted accessed to said event queues by said managing server; and affecting queue data of the user from the event queues of a group of authenticated users' data after identifying said authenticated user through the interrogation, associated identifier of said user having an authenticated reservation of goods or services or activities, by sending a change of queue status to the managing server; and providing said authenticated user with reserved goods or services according to said queues transmitted to each good or service experience clients or servers having redemption responsibility according to reservation data in said good or service experience redemption windows;

wherein said clients and servers include a plurality of point of sales clients, providing, by a plurality of media playback systems including a media playback server, public display device, automation systems, and an audio processor, services or access to goods and services to a said plurality of authenticated users, and wherein said point of sales clients and media playback servers are connected to a machine-readable label interrogator as one of said plurality of interrogation devices, receiving, by said point of sales clients and media playback servers, data from said interrogator, and associating and recording event data with an identifier from a machine readable label through use of said event queues, and outputting data regarding a transaction in which goods or services or activities are redeemed, permitting, by said clients and servers, each authenticated user to complete transactions involving said event data and said identifier on said machine-readable label, and by said managing server, receiving said event queues and granting access to said event queues to a local good or service experience client or server before said authenticated users' arrivals at said at least one specific good or service experience client or server as a component towards authenticated users' redemptions and authenticated users' redemptions confirmations, and executing, by said point of sales clients and media playback systems connected to the associated one of said machine-readable label interrogators, audio playback, video playback, or environmental feedback after receiving data from one of said machine readable labels; and initiating, by said point of sales clients and media playback systems connected to the associated one of said machine-readable label interrogators, a checking of reservation status on the good or service experience clients and servers corresponding with the good or service experience redemption windows after receiving data from one of said machine readable labels; and preparing for redemption, by said point of sales clients and media playback systems connected to the associated one of said machine-readable label interrogators, the good or service experience clients and servers corresponding with the good or service experience redemption windows after receiving data from one of said machine readable labels.

6. The method according to claim 5, wherein said event queues contain instructions for said authenticated user's redemption of reserved goods or services at each good or service experience client or server according to said authenticated user group's reservation data in good or service experience redemption windows.

7. The method according to claim 5, wherein said instructions contained in said event queues include instructions for vendors present at said remote site and vendors not present at said remote site to forward goods or services or activities near to said good or service experience clients or servers before authenticated users' arrivals.

* * * * *

UNITED STATES PATENT AND TRADEMARK OFFICE
CERTIFICATE OF CORRECTION

PATENT NO. : 9,740,990 B2
APPLICATION NO. : 13/104525
DATED : August 22, 2017
INVENTOR(S) : Watkins It is certified that error appears in the above-identified patent and that said Letters Patent is hereby corrected as shown below:

On the Title Page

Item (12) should be corrected to read:
Watkins, et al.

Item (75) should be corrected to read:
Jennifer Watkins, Bellevue, NE (US)
Mark Watkins, Highlands Ranch, CO (US)

Signed and Sealed this
Fourth Day of October, 2022

Katherine Kelly Vidal
*Director of the United States Patent and Trademark Office*